US005714563A

United States Patent [19]
DePompei et al.

[11] Patent Number: 5,714,563
[45] Date of Patent: Feb. 3, 1998

[54] ONE-PART, LOW VISCOSITY, MOISTURE CURABLE COMPOSITION

[76] Inventors: Michael Frederick DePompei, 8108 N. Hills Dr., Broadview Heights, Ohio 44147; Ronald John Janoski, 18358 Chillicothe Rd., Chagrin Falls, Ohio 44023

[21] Appl. No.: 585,826

[22] Filed: Jan. 16, 1996

[51] Int. Cl.$^6$ .................................................. C08G 18/10
[52] U.S. Cl. ........................... 528/59; 528/228; 528/229; 524/705; 525/185
[58] Field of Search ..................... 528/59, 328, 229; 524/705; 525/185

[56] References Cited

U.S. PATENT DOCUMENTS

| | | | |
|---|---|---|---|
| 3,017,388 | 1/1962 | Caldwell et al. | 528/128 |
| 3,627,836 | 12/1971 | Getson | 525/100 |
| 4,138,387 | 2/1979 | Bluestein | 528/25 |
| 4,687,809 | 8/1987 | Kamikaseda et al. | 525/57 |
| 4,708,821 | 11/1987 | Shimokawa et al. | 512/12 |
| 4,929,661 | 5/1990 | Noomen et al. | 524/259 |
| 4,987,186 | 1/1991 | Akiyama et al. | 525/107 |
| 5,017,649 | 5/1991 | Clemens | 525/59 |
| 5,017,676 | 5/1991 | Cuscurida | 528/121 |
| 5,021,537 | 6/1991 | Stark et al. | 528/106 |
| 5,051,529 | 9/1991 | Witzeman et al. | 560/178 |
| 5,132,367 | 7/1992 | Chan | 525/131 |
| 5,242,978 | 9/1993 | Schäfer | 525/102 |
| 5,319,008 | 6/1994 | Janoski | 524/59 |
| 5,426,148 | 6/1995 | Tucker | 524/496 |

FOREIGN PATENT DOCUMENTS

| | | |
|---|---|---|
| 0 457 129 A2 | 11/1991 | European Pat. Off. |
| 0 483 583 A2 | 5/1992 | European Pat. Off. |
| 0 511 586 A | 11/1992 | European Pat. Off. |
| 0 531 850 A2 | 3/1993 | European Pat. Off. |
| 0 564 883 A | 10/1993 | European Pat. Off. |
| 0 603 716 A | 6/1994 | European Pat. Off. |
| 6 1078-883-A | 4/1986 | Japan. |
| WO 94 21738 A | 9/1994 | WIPO. |

OTHER PUBLICATIONS

An article entitled "High Solids Multifunctional Polyols," Eslinger, Delano R., and Ryer, Dennis, from Paint and Coatings Inc., vol. 7, No. 2, pp. 34 and 36, Jan. 1, 1991, published by Business News Publishing Co., Troy, Michigan.

An article entitled "Michael Addition Polymers From 1,4 and 1,3 Benzenedimethanol Diacetoacetates and Tripropylene Glycol Diacrylate," Trumbo, David L., from *Polymer Bulletin*, 26 p. 265–270 Mar. 20, 1991, published by Springer: N.Y., N.Y.

Trade literature entitled "Burmastic Cold Process Built–Up Roofing System," R–751501, Sep. 1, 1987, published by Tremco, 10701 Shaker Blvd., Cleveland, OH 44104.

An article entitled "Acetoacetylation: A Process for Polyol Viscosity Reduction," W. T. Petroskey, L. Gott, T. E. Carter, presented Oct. 10, 1993, published by the Society of the Plastics Industry: N.Y., N.Y.

"Standard Practice for Testing Load–Strain Properties of Roofing Membranes," ASTM D2523, Jul. 1, 1978 by ASTM Committee on Standards: Philadelphia, PA.

Journal of Coatings Technology, vol. 62, No. 789, pp. 101–112, Oct. 1, 1990, XP000444172; W.D. Nottingham, F. Del Rector: "Comparison of methods for the preparation of acetoacetylated coating resins". (J. Stewart Witzeman).

*Primary Examiner*—Rachel Gorr

[57] ABSTRACT

A one-part, low viscosity, moisture curable composition which exhibits excellent shelf stability in the absence of water, but which quickly cures at ambient conditions upon exposure to moisture in the air is a substantially anhydrous mixture containing an acetoacetate functional compound and a polyisocyanate functional compound. The composition can be suitably formulated for use as an ambient temperature, moisture curable adhesive, sealant or coating composition. The acetoacetate functional compounds have a relatively low viscosity as compared with conventional isocyanate functional compounds and thereby reduce or eliminate the need for plasticizers, organic solvents, or both. The cure chemistry of the composition simultaneously consumes and generates moisture at approximately the same rate thereby facilitating rapid cure under even low humidity conditions, and allows for efficient and facile curing of even thick layers of the composition.

18 Claims, No Drawings

ONE-PART, LOW VISCOSITY, MOISTURE CURABLE COMPOSITION

FIELD OF THE INVENTION

This invention relates to a low viscosity, one-part adhesive, coating, or sealant composition which quickly cures at ambient conditions upon application and exposure to moisture. More particularly, the invention pertains to such compositions containing acetoacetylated prepolymers which exhibit excellent storage stability under anhydrous conditions but which rapidly cure with isocyanate functionalized compounds upon exposure to moisture.

BACKGROUND OF THE INVENTION

Conventional one-part urethane adhesive, coating, and sealant compositions have been comprised of isocyanate functionalized resins and crosslinkers or a combination of isocyanate functionalized and blocked amine functionalized compounds which are activated by moisture and/or heat. Such compositions have exhibited relatively high inherent viscosities. In order to lower their viscosity to an acceptable level which will facilitate easy application, such conventional one-part urethane compositions generally contain significant amounts of organic solvents and/or plasticizers. The use of organic solvents and plasticizers, however, has certain disadvantages including longer drying time and escape of volatile organic pollutants into the atmosphere. The use of plasticizers results in blooming and migration of the plasticizers onto surrounding materials, such as asphalt membranes, causing damage thereto. Another disadvantage of conventional moisture cure systems is the generation of a significant amount of gaseous molecules during the curing, particularly carbon dioxide. These gaseous molecules tend to agglomerate to form gas bubbles or voids which can detrimentally affect the appearance and integrity of the cured sealant or adhesive compositions.

Other attempts to reduce the viscosity to an acceptable level have included the use of lower molecular weight components which can reduce or eliminate problems associated with the use of organic solvents or plasticizers, but which have an adverse affect on the drying and curing time, and increase the amount of gas molecules generated during the cure.

Compositions containing an acetoacetylated polymer or oligomer and polyamine crosslinking agents are described for example in U.S. Pat. No. 5,242,978. These compositions, however, have an extremely short pot life of about 30 minutes. Such compositions must be prepared at the point of application and must be used quickly after preparation. Accordingly, these curable compositions cannot be stored after preparation, and are, therefore, inconvenient and will tend to generate more waste because of premature curing of portions of the composition prior to application.

A two-part sealant composition comprising a first part containing a polyester or polyether oligomer having acetoacetate end groups or functionalities, and a second part containing amine end groups or functionalities is disclosed in U.S. Pat. No. 5,426,148. These compositions have the obvious disadvantage of requiring mixing or coapplication of the two parts at the point of application.

Accordingly, there remains a need for a one-part, resin based composition suitable for use as a coating, sealant or adhesive, which has an inherently low viscosity, thereby significantly reducing or eliminating the need for organic solvents or plasticizers to achieve good application properties, and which quickly drys and cures at ambient conditions.

SUMMARY OF THE INVENTION

The one-part, low viscosity, moisture curable resin compositions of the present invention comprise an acetoacetyl functional polymer or oligomer, and a polyisocyanate compound (prepolymer). Surprisingly, it has been discovered that such compositions, when prepared and maintained under substantially anhydrous conditions, exhibit excellent long-term shelf stability and exhibit relatively low inherent viscosity thereby reducing or eliminating the need for plasticizers and/or organic solvents. Upon application and exposure to moisture at ambient conditions, the compositions quickly cure and dry to form a thermoset having a high solids content. More specifically, the lower inherent viscosity of the acetoacetate functionalized polymer or oligomer, as compared with isocyanate or other functionalized polymers or oligomers, facilitates easy handling and application thereby significantly reducing or eliminating the need for organic solvents or plasticizers. The reduction or absence of organic solvents leads to faster drying and curing time, and reduces pollution associated with the emission of volatile organic chemicals. The reduction or absence of plasticizers has the advantage of reducing or eliminating problems associated with blooming and migration of the plasticizer to adjacent materials which can be damaged or degraded by the plasticizers.

In addition to the foregoing advantages, the cure chemistry of the composition facilitates rapid curing even in arid environments. Specifically, only a catalyzing amount of moisture is needed to convert isocyanate groups of the polyisocyanate compound (crosslinker) into amine groups. Thereafter, the amine groups of the crosslinking compound readily reacts with the acetoacetyl groups of the polymer or oligomer via a condensation reaction which produces water which can react with more isocyanate groups thereby propagating the cure. In addition to facilitating rapid curing even in a low humidity environment, the cure chemistry of the composition also allows rapid curing of relatively thick applications of the composition to a substrate, because the moisture cure chemistry is not as dependent upon diffusion rates of moisture through the composition as a 100% isocyanate cure system.

DESCRIPTION OF THE PREFERRED EMBODIMENTS

The acetoacetate functionalized polymers or oligomers (compound) which can be used in association with the compositions of the invention generally include any of a variety of well known polymers or oligomers having acetoacetyl functional groups. Examples of suitable acetoacetate functionalized polymers include acetoacetate functionalized acrylic polymers, acetoacetate functionalized polyesters, and acetoacetate functionalized polyethers, and other acetoacetate functionalized polymers or oligomers prepared by acetoacetylation of hydroxyfunctional polymers or oligomers. Preferred acetoacetate functionalized polymers include polyesters and polyethers, with acetoacetate functionalized polyethers being most preferred.

Acetoacetate functionalized polymers or oligomers can be prepared by acetoacetylation of polyhydroxy compounds with alkyl acetoacetates, diketene or other acetoacetylating compounds. Suitable polyhydroxy compounds include polyhydroxy polyesters, polyhydroxy polyethers and polyhydroxy polyacrylates.

Examples of polyhydroxy polyesters which can be used in the practice of the invention include those having a number average molecular weight of from about 500 to about 5,000, and more preferably from about 500 to about 3,000. The polyhydroxy polyesters can be prepared from condensation reactions of polybasic carboxylic acids or anhydrides and a stoichiometric excess of polyhydric alcohols, or from a mixture of polybasic carboxylic acids, monobasic carboxylic acids and polyhydric alcohols. Examples of polybasic carboxylic acids and anhydrides which can be used in preparing the polyhydroxy polyesters include those having from 2 to about 18 carbon atoms, and preferably having from 2 to about 10 carbon atoms, such as adipic acid, glutaric acid, succinic acid, malonic acid, pimelic acid, sebacic acid, suberic acid, azelaic acid, 1,4-cyclohexane dicarboxylic acid, phthalic acid, phthalic anhydride, isophthalic acid, terephthalic acid, tetrahydrophthalic acid, hexahydrophthalic acid, and the like, as well as combinations thereof. Preferred compounds include malonic acid, tetrahydrophthalic acid, and hexahydropthalic acid. Monobasic carboxylic acids which can be used include, for example, those having from 1 to about 18 carbon atoms, and more preferably from 1 to about 10 carbon atoms, such as formic acid, acetic acid, propionic acid, butyric acid, valeric acid, caproic acid, caprylic acid, capric acid, lauric acid, myristic acid, palmitic acid, stearic acid, and the like, as well as combinations thereof. Suitable polyhydric alcohols which can be used include those having from 2 to about 18 carbon atoms, and desirably from about 2 to about 10 carbon atoms, such as ethylene glycol, propylene glycol, hexene-1,6-diol, trimethylol propane, glycerol, neopentyl glycol, pentaerythritol, butylene glycol, 2-methyl-1,3-propane diol, hexylene glycol, and the like, as well as combinations thereof. Preferred alcohols include trimethylpropane, glycol, and pentaerythritol.

Polyhydroxy polyethers which can be used in practicing the invention generally include those having a number average molecular weight of from about 500 to about 10,000, and more preferably from about 500 to about 6,000. The polyhydroxy polyethers can be prepared by well known ring-opening polymerization of cyclic ethers using an ionic initiator. Examples of polyhydroxy polyethers which can be used include those polyalkylene oxides wherein the alkylene group contains from 2 to about 8 carbon atoms, and preferably from 2 to 4 carbon atoms, such as polyethylene oxide polyols, polypropylene oxide polyols, polybutylene oxide polyols, polytetramethylene oxide polyols, and the like.

Other polyhydroxy polymers or oligomers which can be used in the practice of the invention include addition polymers, especially copolymers of acrylates and/or methacrylates which are the reaction product of one or more alkyl acrylates and/or alkyl methacrylates, one or more unsaturated monomers containing a hydroxyl group, and, optionally, one or more other ethylenically unsaturated monomers which are free of hydroxyl or other residual functional groups. Such polymers can be prepared using conventional free radically initiated addition polymerization techniques. Examples of suitable acrylates and methacrylates include any of various acrylic acid esters and methacrylic acid esters wherein the ester portion has from 1 to 10 carbon atoms such as methyl methacrylate, methyl acrylate, ethyl acrylate, ethyl methacrylate, 2-ethyl hexyl acrylate, and the like. Examples of other ethylenically unsaturated monomers which do not have hydroxyl functional groups such as vinyl substituted aromatics having from 8 to 12 carbon atoms include styrene, a-methyl styrene, vinyl toluene, and the like; nitrile monomers such as acrylonitrile and methacrylonitrile; vinyl acetate, ethylene, ethylene chloride, vinylidene chloride; etc. Examples of ethylenically unsaturated monomers containing a hydroxyl group include any of various hydroxyalkyl acrylates or methacrylates having a total of from 3 to 15 carbon atoms such as hydroxyethyl acrylate, hydroxyethyl methacrylate, hydroxypropyl acrylate, hydroxypropyl methacrylate, hydroxyhexyl acrylate, hydroxyhexyl methacrylate, and the like.

Still further examples of polyhydroxy polymers or oligomers which are suitable for use in the practice of the invention include hydroxyl-terminated copolymers of butadiene and acrylonitrile, such as HYCAR®HTBN(1300×17), and hydroxy terminated organopoly-siloxanes, which are well known and are commercially available. Suitable polyhydroxy polymers or oligomers which can be used also include polytetrahydrofuran polyols, polycarbonate polyols, and caprolactone based polyols.

The acetoacetate functionalized polymers or oligomers can be prepared by a transesterification reaction wherein any of the above polyhydroxy compounds, or combinations thereof, are contacted with an alkyl acetoacetate, either with or without a solvent. The reaction proceeds in accordance with the following chemical equation:

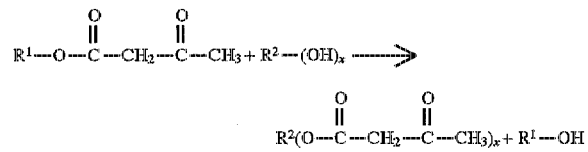

where $R^1$ is preferably a lower molecular weight alkyl group, and $R^2$—$(OH)_x$ is any of the above-noted polyhydroxy polymers or oligomers having a functionality of x. The transesterification is generally carried out at an elevated temperature such as from about 80 to about 160° C., and more preferably from about 120° to about 150° C. The trans-esterification reaction is preferably conducted in the presence of a transesterification catalyst such as calcium acetate, zinc acetate, bismuth acetate, lead oxide, trichloroacetic acid or the like. Suitable alkyl acetoacetates generally include those wherein the alkyl group $R^1$ contains from about 2 to about 18 carbon atoms, and more preferably from about 2 to about 10 carbon atoms. Examples of alkyl acetoacetates include ethyl acetoacetate, n-propyl acetoacetate, isopropyl acetoacetate, n-butyl acetoacetate, isobutyl acetoacetate, tert-butyl acetoacetate, with tert-butyl acetoacetate being most preferred because of its short reaction time and because the reaction can be easily driven toward completion by distilling off the tert-butanol that is formed during the reaction. In accordance with one embodiment, the reaction is allowed to proceed to relatively high conversions of the hydroxyl groups into acetoacetate functional groups, such as at least 75%, and more desirably at least 90 or 95%, and preferably at least 98 or 99%.

In accordance with another embodiment, the hydroxyl groups of the polyhydroxy polymers or oligomers are partially acetoacetylated such as to a level of less than about 70 percent, for example from about 10 to about 50 percent, acetoacetylation of the hydroxyl groups. The remaining hydroxyl groups are reacted with a polyisocyanate compound to provide polymers or oligomers which contains both acetoacetyl and isocyanate functional groups which can be combined with polyisocyanate compounds under anhydrous conditions to provide a moisture curable composition.

Alternatively, the above hydroxyl functionalized polymers and oligomers can be reacted with diketene or the diketene acetone adduct desirably having from 25 to 300 carbon atoms, either in the absence or in the presence of a suitable catalyst such as a tertiary amine, an acid such as sulfuric acid, a basic salt such as sodium acetate, or an organometallic compound such as dibutyltin laurate to provide the desired acetoacetate functionalized polymers which are suitable for use with the invention.

Suitable reaction temperatures for the acetoacetylation of hydroxyl functionalized polymers and oligomers are typically in the range from about 60° C. to about 110° C.

Another method for preparing acetoacetate functionalized polymers and oligomers which can be utilized in the practice of the invention includes addition copolymerization of ethylenically unsaturated monomers, wherein at least one of the monomers is an acetoacetyl group containing monomer. Suitable ethylenically unsaturated monomers which do not contain other functional groups include polyvinyl aromatics, acrylic and methacrylic acid esters and other similar monomers as set forth above with respect to the preparation of polyhydroxy functional addition polymers. Suitable ethylenically unsaturated monomers having an acetoacetyl group can be prepared by the transesterification reaction of hydroxyl group containing ethylenically unsaturated monomer such as a hydroxyalkyl acrylate or methacrylate with an alkyl acetoacetate such as tert-butyl acetoacetate, or by reaction of a hydroxyl group containing ethylenically unsaturated monomer with diketene, diketene acetone adduct or other acetoacetylating agent.

Polyisocyanate crosslinking and/or chain extension agents which can be utilized in the preparation of the one-part moisture curable composition of the invention include any of various polyisocyanate compounds containing two or more isocyanate groups, including simple compounds, as well as polyisocyanate functionalized polymers or oligomers (prepolymers). Examples of simple, non-polymeric polyisocyanate compounds include aliphatic, cycloaliphatic, aromatic, alkyl substituted aromatic, etc., polyisocyanates having a total of from about 5 to about 30 carbon atoms, such as trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω'-dipropyl ether diisocyanate, 1,3-cyclopentene diisocyanate, 1,2-cyclohexane diisocyanate, 1,4-cyclohexane diisocyanate, isophorone diisocyanate, 4-methyl-1,3-diisocyanatocyclohexane, dicyclohexylmethane-4-4'-diisocyanate, 3,3'-dimethyl-dicyclo-hexylmethane-4,4' diisocyanate, toluene diisocyanate, 1,3-bis(1-isocyanate-1-methylethyl)-benzene, 1,4-bis(1-isocyanate-1-methylethyl)benzene, 1,3-bis(isocyanatomethyl)benzene, xylylene diisocyanate, 1,5-dimethyl-2,4-bis(isocyanate- methyl)benzene, 1-5-dimethyl-2,4-bis-(isocyanato ethyl)benzene, 1,3,5-triethyl-2-4 bis(isocyanatomethyl)-benzene, 4,4'-diisocyanato diphenylmethane, 3,3'-dimethyl-4,4'diisocyanatodipheyl methane, various adducts of diisocyanates such as hexamethylene diisocyanate of isophorone diisocyanate, 1,3,5-triisocyanato benzene, 2,4,6-triisocyanato toluene, the tetraisocyanate adduct of pentaerythritol and toluene diisocyanate, and the like. Preferred polyisocyanates include the various isomers of methylene diphenylene isocyanate (MDI) such as 4,4'-MDI and 2,4'-MDI.

Examples of suitable polymeric and oligomeric polyisocyanates include the reaction product of a polyhydroxy functional polymer, such as the polyhydroxy polyesters, polyhydroxy polyethers, and polyhydroxy addition polymers and oligomers described above, with a stoichiometric excess of a polyisocyanate such as those listed above. The isocyanate group to hydroxyl group ratio (NCO:OH) is desirably from about 2 to about 10, and more preferably from about 2 to about 4.

The compositions of the invention can include any combination of di-, tri- and other polyacetoacetate and polyisocyanate functional compounds depending on the properties which are desired. Difunctional isocyanates and a combination of diols and triols are generally preferred, with the polyacetoacetate functional compounds having an average functionality of from about 1 to about 3, and preferably from about 1.2 to about 1.8.

In addition to the acetoacetylated polymers and/or oligomers, the composition can also include minor amounts of non-polymeric polyacetoacetates having a molecular weight in the range from about 200 to about 500 or 800. Examples of such compounds include the bisacetoacetates of dipropylene glycol, ethylene glycol and neopentyl glycol; the triacetoacetates of trimethylolpropane, trimethylolethane, glycerol and bis(trimethylolpropane); the tetrakis acetoacetate of pentaerythritol; and the like, as well as combinations thereof. The lower molecular weight polyacetoacetates can be used in the composition of the invention in minor amounts such as amounts which are effective to reduce the viscosity of the composition to a desired level. Generally, the lower molecular weight, non-polymeric polyacetoacetates can be present in amounts ranging from 0 up to about 30 or 40 weight percent based upon the weight of said compounds, the polyisocyanate functionalized polymers, and the various acetoacetate functionalized polymers or oligomers.

The polyacetoacetate functionalized polymers, oligomers, and non-polymeric (i.e. free of repeat units which form a backbone or chain) compounds are generally present in the composition in amounts relative to the amount of isocyanate group containing compounds such that the ratio of isocyanate functional groups to acetoacetyl functional groups is in the range of from about-10 to about 0.2, and more preferably in the range from about 3 to about 0.5. The compositions can contain any of a variety of different polyacetoacetate functional polymers or oligomers or combinations thereof, with polyacetoacetate functional polyethers being preferred. It has been found that the polyacetoacetate functionalized polymers can have viscosities of only several hundred centipoise while a polyisocyanate functionalized version of the same polyol will have a viscosity in the thousands of centipoise.

The acetoacetylated compounds and the polyisocyanate compounds are combined, along with other optional ingredients, under substantially anhydrous conditions and maintained in a sealed container until used. Upon application to a substrate the isocyanate groups of the polyisocyanate compounds readily react with ambient moisture to form polyamines and carbon dioxide as follows:

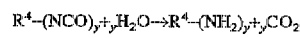

where $R^4$ is the polyisocyanate compound less the isocyanate groups and y is from 2 to 5.

The polyamines then rapidly react with the acetoacetylated prepolymers as follows:

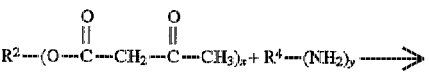

-continued

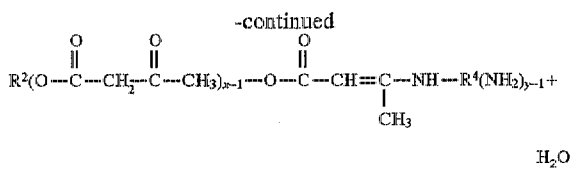

where $R^2$ is the acetoacetylated prepolymer less the acetoacetate groups and x is generally from about 2 to about 4.

As shown by the above reaction, a single acetoacetate group of the prepolymer or oligomer reacts with a single amine group of the polyamine product of moisture and polyisocyanate compounds. The reaction of course continues until either substantially all of the amine or all of the acetoacetate groups, which ever is in excess, are exhausted. Each reaction of an amine group with an acetoacetate group generates a water molecule which in turn can react with an isocyanate group generating a new amine group. Accordingly, only a small (catalyzing) amount of moisture is needed to complete the reaction.

The one-part moisture curable compositions of the invention can be formulated for use as sealants, adhesives, or coatings, with a particularly well suited application of the invention being as an adhesive composition for bonding asphalt coated glass membrane roofing sheets together and to insulation sheets during the construction or repair of a built-up roofing system.

The compositions of the invention can optionally include plasticizers such as dibutyl phthalate, butylbenzyl phthalate, and other phthalates; adipates, sebacate esters; benzoates; phosphates and the like, as well as combinations thereof. Plasticizers can generally be used at substantially lower levels in the composition of the invention than are currently used in conventional one-part moisture curable formulations to achieve the desired rheological properties. Generally, plasticizers are used, if at all, in amounts less than about 200 parts, and more preferably less than about 150 parts, by weight per 100 parts by weight of the acetoacetate functional and isocyanate functional compounds.

The composition of the invention can optionally reduce viscosity to a desired level which facilitates easy application and use of the composition. Examples of organic solvents which can be used include aliphatic, cycloaliphatic and aromatic solvents such as hexane, cyclohexane, benzene, toluene, xylene, etc. Such organic solvents are generally utilized in significantly smaller quantities than are required with conventional one-part moisture-curable compositions. Organic solvent, when used, are preferably present in an amount less than about 10 parts, and more preferably less than about 5 parts, by weight per 100 parts by weight of the acetoacetate functional and isocyanate functional compounds. Preferably, no organic solvents are added except possibly those present as impurities in the other ingredients.

In order to accelerate the moisture cure upon exposure of the composition of the invention to ambient air, any of various known catalyst which promote reaction of the isocyanates groups with water to form primary amine groups and carbon dioxide can be added. Suitable catalysts generally include a variety of divalent tin catalysts such as stannous octoate, dioleate, palmitate, oxalate, acetate and the like. Such catalysts may be used in amounts effective to accelerate the cure, such as from about 0.005 to about 0.10 parts by weight per 100 parts by weight of the acetoacetate functional and isocyanate functional compounds.

The compositions of the invention can generally be formulated with a variety of conventional additives used in conventional amounts to achieve desired affects. Such additives include adhesion promoters such as polyisobutylene; driers and carbon dioxide absorbers such as calcium oxide; antioxidants such as combinations of hindered phenols and phosphate compounds; rheology modifiers; surfactants and or compatibilizing agents to help achieve a stable dispersion of the various ingredients in the composition; asphalt; carbon fillers; hydrocarbon resins; mineral fillers such as talc, clay, calcium carbonate, mica, and the like; reinforcing fibers such as Kevlar® fibers, carbon fibers, ceramic fibers, polyethylene fibers, and the like; etc.

The composition of the invention generally have a high solids content such as at least 90 weight percent and more desirably at least 95 weight percent, and most preferably above 98 and 99 weight percent. Solids content as used above refers to the weight of the cured composition as a percentage of the weight of the material prior to curing.

The compositions of the invention should be carefully prepared under substantially anhydrous conditions, and placed in a sealed container in the absence of water until used. Accordingly, care should be taken to ensure that any additives are substantially free of moisture prior to being added to the compositions of the invention. Procedures and precautions which are required to prepare and maintain the compositions of the invention under substantially anhydrous conditions are generally well known to those having ordinary skill in the art of preparing moisture curable adhesives, coatings and sealants. The compositions of the invention should generally contain less than 0.1%, and preferably less than 0.05% moisture on a weight basis.

The compositions can generally be formulated into a variety of adhesives, sealants or coatings which can be applied at ambient temperatures of from about 35 to about 120° F. (2° C. to 49° C.), and more preferably at temperatures from about 50° to about 120° F. (10° C. to 49° C.). The compositions will achieve a relatively fast cure rate even at low humidity conditions such as 1 or 2 percent.

The adhesive, sealant and coating compositions of the invention can generally comprise from about 20 to 80 parts by weight of acetoacetylated prepolymer, more desirably from about 30 to about 50 per 100 parts by weight of isocyanate functionalized prepolymer, from about 10 to about 200 parts by weight of asphalt, more desirably from about 50 or 100 to about 150 per 100 parts by weight of the isocyanate functionalized prepolymer, and from about 10 to about 120 or 150 parts by weight of plasticizer, more desirably from about 40 to about 80 per 100 parts by weight of isocyanate functionalized prepolymer. The compositions of the invention also preferably contain from about 0.1 to about 2 parts by weight of an aromatic polyamide such as Kevlar®, and from about 0.05 to about 3 parts by weight of a silane coupling agent, desirably reactive both with amine groups derived from an isocyanate group and water and a hydroxyl group on the fiber, such as γ-glycidoxy propyl trimethoxy silane.

Upon curing the compositions of the invention generally undergo random crosslinking and chain extension reactions wherein polyisocyanate groups which have been converted into primary amine groups by reaction with water can react either with other isocyanate groups or with acetoacetyl groups thereby forming a random cured polymeric structure which exhibit excellent tensile strength and tear strength.

A more complete understanding of the invention can be had by reference to the following illustrative examples.

EXAMPLES

An acetoacetylated prepolymer in accordance with the invention was prepared by mixing 85.119 parts by weight of polypropylene glycol having a weight average molecular weight of about 1025, 27.930 parts by weight of t-butyl acetoacetate, and about 0.037 parts by weight of Coscat®83 (a bismuth carboxylate salt catalyst). The mixture was heated to a temperature of about 140° C. and allowed to react for a period of 1–2 hours to form an acetoacetylated prepolymer in accordance with the invention. Approximately, 13.086 parts by weight of t-butyl alcohol were distilled from the products of the above transesterification reaction.

A polyisocyanate functionalized prepolymer was prepared by mixing 70.2 parts by weight of a poly(propylene-oxide) triol available from BASF and having a weight average molecular weight of approximately 6,000 and an average hydroxyl functionality of from about 2.2 to about 2.4, 14.964 parts by weight of methylene diphenylene isocyanate, 0.034 parts by weight of dibutyltin catalyst, and 14.802 parts by weight of Santicizer®160 (a plasticizer available from the Monsanto Company consisting primarily of butylbenzopthalate), heating to a temperature of about 50° C. and allowed to react for a period of 20 minutes to form an isocyanate functionalized prepolymer.

An asphalt blend was prepared by mixing 6.269 parts by weight of dioctyl adipate, 28.978 parts by weight of Santicizer®160, 57.979 parts by weight of asphalt having a rating of 200 Pen (penetration), 0.207 parts by weight of Cyanox®2777 (an antioxidant available from American Cyanamid comprising a hindered phenol and phosphate), 2.296 parts by weight of Vistanex (polyisobutylene), 0.873 parts by weight of maleic anhydride, 0.230 parts by weight of calcium oxide, 2.870 parts by weight of Bentone®SD-2 (an organo-treated clay filler and dispersing agent used as a rheology modifier), 0.069 parts by weight of Cotin®227 (tin acetate catalyst), and approximately 0.230 parts by weight of surfactant (CPH-52-SE, available from C. P. Hall Co.).

A moisture curable adhesive composition in accordance with the invention was prepared by blending the above isocyanate prepolymer, acetoacetylated prepolymer and asphalt blend with Santicizer®160, acetylene black, Kevlar® fibers, and a silane coupling agent in the amount set forth in Table I.

TABLE I

| Component | Comparative Sample 1 pph | Comparative Sample 2 pph | Invention pph |
|---|---|---|---|
| Isocyanate Functionalized Prepolymer | 100 | 100 | 100 |
| Acetoacetylated Prepolymer | — | — | 39.99 |
| Asphalt Blend (29% Santicizer®) | 135 | 135 | 129.9 |
| Santicizer® 160 | 117.4 | 252.4 | 66.6 |
| Acetylene Black | 3 | 3 | — |
| Kevlar® Fibers | — | 1.4 | .98 |
| Silane (γ-glycidoxy propyl-trimethoxy silane) | 0.4 | 0.42 | .98 |
| Total | 356.2 | 492.22 | 338.45 |
| Total Plasticizer | 173.4 | 308.4 | 131 |
| Total Polymer | 100 | 100 | 139.99 |
| Plasticizer Migration | poor | poor | Very good |
| Where Manufactured | Pilot Plant | Plant  Lab | Plant  Lab |
| Brookfield Visc, #4, 10 rpm | 3.0 | 4.5  11.5 | 9  10.0 |
| Flowmeter, 20 g, 10 psi | 14.0 | 9.0  25.0 | 14  28.0 |

For purposes of comparison, two conventional moisture curable adhesive compositions were prepared without the acetoacetylated prepolymers as set forth in Table I.

Each of the above compositions were tested for viscosity using a Brookfield HBT Spindle No. 4, at 10 rpm at 20° C. Viscosity was also tested by a flow meter according to ASTM C603. The results show that suitably low viscosities can be achieved using lower amounts of total plasticizer when the acetoacetylated prepolymers of the invention are utilized.

Plasticizer migration was visibly determined by applying 30 mls of each of the above moisture curable adhesive formulations between a pair of felt which are styrene-butadiene-styrene rubber modified membranes having glass or polyester reinforcement to form a composite material consisting of the moisture curable adhesive sandwiched between a pair of felt plies. The composite materials were then cured for 48 hours at room temperature and then for an additional 7 days at 158° F. Thereafter the samples were visually inspected to determine the amount of plasticizer migration. The results show that the adhesive composition of the invention exhibited less plasticizer migration than the comparative examples.

The above composites were tested for tensile strength and elongation. The results are shown in Table I. Tensile strength was determined in accordance with ASTM test standard D-2523-78(1989). Composites prepared using the moisture curable adhesive of the invention showed better tensile strength and elongation than the conventional compositions which did not contain an acetoacetylated prepolymer.

While in accordance with the patent statutes the best mode and preferred embodiment has been set forth, the scope of the invention is not limited thereto, but rather by the scope of the attached claims.

What is claimed is:

1. A moisture curable composition, comprising:
   a substantially anhydrous mixture including an acetoacetate functional organic compound and a polyisocyanate functional prepolymer, wherein said acetoacetate functional organic compound is an acetoacetylated polyol and wherein said acetoacetylated polyol is present from about 20 to about 80 parts by weight per 100 parts by weight of said isocyanate functional prepolymer, wherein said composition is a one-part composition and has long term shelf stability but cures rapidly to form a thermoset on exposure to moisture.

2. The composition of claim 1, wherein said acetoacetylated polyol comprises a polyester, polyether, polyacrylate or a combination thereof.

3. The composition of claim 2, wherein said polyester, polyether, polyacrylate or combination thereof have a number average molecular weight of from about 500 to about 10,000.

4. The composition of claim 1, wherein said polyol comprises a di- or tri-hydroxy polyethylene oxide or polypropylene oxide, or a combination thereof, and wherein said polyol has a number average molecular weight of from about 500 to about 10,000.

5. The composition of claim 4, wherein the ratio of isocyanate groups to acetoacetyl groups is in the range from about 10:1 to about 1:5.

6. The composition of claim 1 wherein said isocyanate functional prepolymer is the reaction product of a polyisocyanate and a polyol.

7. The composition of claim 1, wherein said isocyanate functional prepolymer comprises the reaction product of a polyisocyanate and a polyhydroxy functional polyester formed by condensation reactions, polyether, polyacrylate, or a combination thereof.

8. The composition of claim 7, wherein said polyester, polyether, polyacrylate or a combination thereof has a number average molecular weight of from about 500 to about 10,000.

9. The composition of claim 8, wherein said acetoacetate functional organic compound is present from about 20 to about 80 parts by weight per 100 parts of said isocyanate functionalized prepolymer wherein said polyisocyanate comprises methylene diphenylisocyanate, wherein said acetoacetate functional organic compound comprises the reaction product of an alkylacetoacetate and a polyhydroxy functional polyester formed by condensation reaction, polyether, polyacrylate or combinations thereof having a number average molecular weight from about 500 to about 10,000, and wherein the ratio of isocyanate groups to acetoacetate groups is from 10:1 to 1:5.

10. A moisture curable composition, comprising:
a substantially anhydrous mixture including from about 20 to about 80 parts by weight of an acetoacetate functional organic compound and a polyisocyanate functional prepolymer, wherein said composition is a one-part composition and has long term shelf stability but cures rapidly to form a thermoset on exposure to moisture, wherein said acetoacetate functional organic compound comprises a partially acetoacetylated polyol, wherein the remaining hydroxyl groups which are not acetoacetylated are reacted with a polyisocyanate to provide a compound having both acetoacetyl functional groups and isocyanate functional groups, and wherein said parts by weight are based upon 100 parts by weight of said polyisocyanate functional prepolymer.

11. The composition of claim 10, wherein said polyol is a polyester, polyether, polyacrylate or a combination thereof having a number average molecular weight of from about 500 to about 10,000, and wherein the ratio of isocyanate groups to acetoacetyl groups is in the range from about 10:1 to about 1:5.

12. The composition of claim 11, wherein said isocyanate functional prepolymer is the reaction product of a polyisocyanate and a polyhydroxy functional polyester, polyether, polyacrylate, or a combination thereof.

13. The composition of claim 1 further comprising from about 10 to about 200 parts by weight of asphalt and from about 10 to about 150 parts by weight of a plasticizer wherein said parts by weight are per 100 parts by weight of said isocyanate functional prepolymer.

14. The composition of claim 9, wherein said composition further comprises from about 10 to about 200 parts by weight of asphalt and from about 10 to about 150 parts by weight of a plasticizer, and wherein said parts by weight are based upon 100 parts by weight of said isocyanate functional polymer.

15. A moisture curable composition, suitable for use as an adhesive, sealant or caulk, comprising:
from about 20 to about 80 parts by weight of a polyacetoacetate functionalized compound which comprises the transesterification product of polyhydroxy polyether or polyhydroxy polyester and an alkyl acetoacetate; and
an isocyanate functionalized prepolymer which is the reaction product of a polyhydroxy polyester or polyhydroxy polyether polymer or oligomer and a polyisocyanate, wherein said composition is a one-part composition and when prepared and stored under anhydrous conditions has long term shelf stability and cures rapidly on exposure to moisture to a thermoset and wherein said parts by weight are based upon 100 parts by weight of said isocyanate functionalized prepolymers.

16. The composition of claim 15, wherein said polyacetoacetate functionalized compound and said isocyanate functionalized prepolymer each have a number average molecular weight of from about 500 to about 10,000, and wherein the ratio of isocyanate groups to acetoacetyl groups is in the range from about 3:1 to about 1:2.

17. The composition of claim 16, further comprising from about 10 to about 200 parts by weight of asphalt per 100 parts by weight of said isocyanate functionalized prepolymer.

18. The composition of claim 17, further comprising from about 10 to about 150 parts by weight of a plasticizer, and wherein said polyisocyanate comprises methylenediphenyl isocyanate.

\* \* \* \* \*